US009428081B2

(12) United States Patent
Riepl et al.

(10) Patent No.: US 9,428,081 B2
(45) Date of Patent: Aug. 30, 2016

(54) FILTER ELEMENT FOR A PNEUMATIC ADJUSTING ARRANGEMENT

(71) Applicants: Continental Automotive GmbH, Hannover (DE); Siemens Energy, Inc., Orlando, FL (US)

(72) Inventors: Johann Riepl, Denkendorf (DE); Andreas Schaeftner, Regensburg (DE)

(73) Assignee: CONTI TEMIC MICROELECTRONIC GMBH, Nuremberg (DE)

( * ) Notice: Subject to any disclaimer, the term of this patent is extended or adjusted under 35 U.S.C. 154(b) by 122 days.

(21) Appl. No.: 14/312,079

(22) Filed: Jun. 23, 2014

(65) Prior Publication Data

US 2014/0375108 A1    Dec. 25, 2014

(30) Foreign Application Priority Data

Jun. 25, 2013  (DE) .................. 10 2013 212 091

(51) Int. Cl.
| | |
|---|---|
| *B60N 2/02* | (2006.01) |
| *B01D 46/10* | (2006.01) |
| *B01D 46/00* | (2006.01) |
| *B60N 2/44* | (2006.01) |

(52) U.S. Cl.
CPC ......... *B60N 2/0224* (2013.01); *B01D 46/0002* (2013.01); *B01D 46/0012* (2013.01); *B01D 46/10* (2013.01); *B60N 2/4415* (2013.01); *Y10T 29/49604* (2015.01)

(58) Field of Classification Search
CPC ............. A47C 7/467; A61G 7/05776; A61H 2201/0138; A61H 2201/0149; B60N 2/4415; B60N 2/448; Y10S 297/03
USPC .............. 55/385.3, 385.1; 117/208; 180/273; 280/735; 297/284.1, DIG. 3
See application file for complete search history.

(56) References Cited

U.S. PATENT DOCUMENTS

| | | | | |
|---|---|---|---|---|
| 3,042,135 A | * | 7/1962 | Riester ................ | E05B 77/50 180/281 |
| 4,721,279 A | * | 1/1988 | Oleszko ............... | B29C 33/10 249/141 |
| 4,840,425 A | * | 6/1989 | Noble .................. | A47C 7/467 297/284.1 |

(Continued)

FOREIGN PATENT DOCUMENTS

| | | | | |
|---|---|---|---|---|
| DE | 19735267 C1 | 4/1999 | ............ | B01D 46/24 |
| DE | 19949345 A1 | 5/2001 | ............ | F15B 13/00 |

*Primary Examiner* — Duane Smith
*Assistant Examiner* — Minh-Chau Pham
(74) *Attorney, Agent, or Firm* — Slayden Grubert Beard PLLC (57) ABSTRACT

A filter element for a pneumatic adjusting arrangement, e.g., a vehicle seat, includes a filter chamber that is fillable with pressure media and includes first and second flexible films connected together along a connecting seam to define the filter chamber. A filter medium for removing particles entrained in the pressure medium is arranged in the filter chamber and separates the filter chamber into first and second chamber regions. The pressure medium may flow into the first chamber region via a pressure medium inlet line, flow into the second chamber region via the filter medium, and flow out of the second chamber region via at least one pressure medium outlet line. By realizing the filter element or the filter chamber thereof from flexible films, the filter element can be installed in a space-saving manner and with a form that can be adapted to the situation.

13 Claims, 4 Drawing Sheets

(56) References Cited

U.S. PATENT DOCUMENTS 6,045,155 A * 4/2000 Cech .................. G01G 5/04
    177/144

2012/0259181 A1 * 10/2012 Fujita .................. A61B 5/18
    600/300
2015/0231009 A1 * 8/2015 Lewis .................. A61G 7/1021
    5/81.1 R

* cited by examiner

FILTER ELEMENT FOR A PNEUMATIC ADJUSTING ARRANGEMENT

CROSS-REFERENCE TO RELATED APPLICATIONS

This application claims priority to DE Patent Application No. 10 2013 212 091.5 filed Jun. 25, 2013. The contents of which are incorporated herein by reference in their entirety.

TECHNICAL FIELD

The present invention relates to a filter element for a pneumatic adjusting arrangement, in particular for a vehicle seat. In addition, the invention relates to a pneumatic adjusting arrangement for a vehicle seat having a filter element of this type, as well as to a vehicle seat having a pneumatic adjusting arrangement just mentioned. Furthermore, the invention relates to a method for producing an above-mentioned filter element.

BACKGROUND

In modern vehicle seats balloons which can be filled with a pressure medium, in particular with compressed air, are situated in a region of the seat or seat back (together designated as the seat bearing surface) as adjusting elements and can be supplied with pressure medium by means of a respective pressure medium line. As a result of filling a respective balloon with pressure medium, the volume thereof is increased such that, as a result, the characteristics of the contour of a seat back or seat are able to be modified. To fill the balloon with pressure medium, said pressure medium is initially generated from a pressure source, for example from a compressor, and is guided to a respective balloon via a corresponding valve, in particular an electropneumatic valve. In the case of said pneumatic systems, it is important here at the same time for the adjusting elements and valves, on the one hand, to be able to be matched finely to the requirements of the passenger. In addition, only limited installation space is available, as a rule, in automobile construction. This calls for the components of the pneumatic system to be designed in a filigree manner. Said design, however, holds the risk of, in particular, the pressure medium line easily being able to become clogged as a result of particles or even dust which is contained in the pressure medium.

SUMMARY

One embodiment provides a filter element for a pneumatic adjusting arrangement, in particular for a vehicle seat, said filter element including: a filter chamber which is fillable with a pressure medium and includes first and second flexible films connected together along a connecting seam in order to define the filter chamber; a filter medium for removing particles entrained in the pressure medium, said filter medium is arranged in the filter chamber and separates the filter chamber into a first part chamber and a second part chamber; a pressure medium inlet line for introducing the pressure medium into the first part chamber; and at least one pressure medium outlet line for removing the pressure medium out of the second part chamber, said pressure medium having flowed out of the first part chamber via the filter medium into said second part chamber.

In a further embodiment, the filter medium is arranged between the at least one first and second flexible film and is connected to said film along the connecting seam.

In a further embodiment, the filter additionally includes a pressure medium aligning device for aligning the pressure medium flow when the pressure medium flows into the first part chamber, wherein the pressure medium aligning device is set up in such a manner in order to align the pressure medium inlet flow away from the center of the first part chamber.

In a further embodiment, the pressure medium aligning device is formed by an end portion of the pressure medium inlet line.

In a further embodiment, the pressure medium inlet line comprises a straight end portion which is moved into the part chamber in such a manner that the pressure medium inlet flow is aligned away from the center of the first part chamber.

In a further embodiment, the filter medium comprises a lattice non-woven fabric or a foam material.

In a further embodiment, the connecting seam is a weld seam.

In a further embodiment, the filter medium is traversable by a gaseous pressure medium, in particular air.

In a further embodiment, the connecting seam is circular in form.

Another embodiment provides a pneumatic adjusting arrangement for a vehicle seat, said pneumatic adjusting arrangement including at least one balloon which is fillable with a pressure medium as an adjusting element; a fluid line for filling and/or emptying the at least one balloon; and a filter element as disclosed above, which is arranged in the fluid line in order to remove particles entrained in the pressure medium.

Another embodiment provides a vehicle seat having a pneumatic adjusting arrangement as disclosed above, which comprises a seat bearing surface, wherein the at least one balloon is arranged below the seat bearing surface for influencing the contour thereof.

Another embodiment provides a method for producing a filter element for a pneumatic adjusting arrangement, said method including: providing at least one first and one second film; arranging a filter medium for removing particles entrained in the pressure medium between the at least one first and one second film; and connecting the at least one first and second film together in such a manner at a connecting seam that a filter chamber, which is separated by the filter medium into a first part chamber and a second part chamber is realized between the films such that pressure medium introduced into the first part chamber is filtered in the direction of the second part chamber when traversing the filter medium.

In a further embodiment, the filter medium is arranged between the at least one first and second flexible film and is connected to the films along the connecting seam.

BRIEF DESCRIPTION OF THE DRAWINGS

Example embodiments of the present invention are explained below with reference to the accompanying drawings, in which.

DETAILED DESCRIPTION

Embodiments of the present invention provide a space-saving design for filtering the pressure medium in a pneumatic adjusting arrangement, e.g., for a vehicle seat.

In this case, a filter element for a pneumatic adjusting arrangement, e.g., for a vehicle seat, includes the following features. It has a filter chamber which is fillable with a pressure medium and includes at least first and second flexible films connected together along a connecting seam in order to realize the filter chamber between them. In this case, the at least one first and the one second film can be respective separate films or can also be corresponding portions of one single film. In addition, the filter element has a filter medium for removing particles entrained in the pressure medium, said filter medium is arranged in the filter chamber and separates the filter chamber into a first part chamber and a second part chamber. In addition, the filter element has a pressure medium inlet line for introducing the pressure medium into the first part chamber and has at least one pressure medium outlet line for removing the pressure medium out of the second part chamber, said pressure medium having flowed out of the first part chamber via the filter medium into said second part chamber. As a result of designing the filter element or the filter chamber from two flexible films, a filter element is created in this way which, on the one hand, is space-saving and when installed into its site of destination, such as in a vehicle seat, is adaptable in its shape. Furthermore, by using flexible films for the filter chamber, the operating noise during the filtering operation can be reduced as no clattering, for example, can occur.

According to one development of the filter element, the filter medium is arranged between the at least one first and one second flexible film and is connected to said films along the connecting seam. In particular, said connection is realized in such a manner that it is pressure-medium-tight in order to prevent the pressure medium escaping out of the filter chamber. In this way, a space-saving design of the filter element is ensured which, on the one hand, is easily producible and ensures good stability in operation.

According to a further development of the filter element, said filter element additionally comprises a pressure medium aligning device for aligning the pressure medium flow when the pressure medium flows into the first part chamber, wherein the pressure medium aligning device is set up in such a manner in order to align the pressure medium inlet flow away from the center of the first part chamber or in an off-center manner. As a result of such an alignment of the pressure medium flow or pressure medium inflow into the filter chamber, the generation of turbulent flows when filling the filter chamber and consequently also the flow noise connected thereto is reduced, as when the balloon chamber is filled, it is not the balloon chamber wall opposite the pressure medium inlet that is directly targeted. As a result of said reduction in the flow noises when the pressure medium flows into a filter chamber of the filter element, comfort during the operation of the filter element is consequently also clearly increased and said filter element obtains greater user acceptance.

In this case, the pressure medium aligning device can be set up in such a manner so as to align the pressure medium flow along an inside wall of the filter chamber. In this way, turbulent flows in the interior of the filter chamber are additionally reduced and flow noises are consequently reduced.

According to a further development of the filter element, the pressure medium aligning device is formed by an end portion of the pressure medium inlet line. In this case, said end portion of the pressure medium inlet line can, in particular, also project into the filter chamber. By combining said two elements of the pressure medium aligning device and of the pressure medium inlet line, expenditure on the structure of the filter element is consequently minimized and consequently also the costs.

According to a further development of the just-described amalgamation of the pressure medium aligning device and the pressure medium inlet line, the pressure medium inlet line comprises a straight end portion which is moved in such a manner into the at least one first film that the pressure medium flow (from said straight end portion as pressure medium aligning device) is aligned away from the center of the balloon chamber. Consequently, on the one hand structural expenditure is minimized as a result of combining two elements as is the process control expenditure of the entire filter element as pressure medium flow aligning can be carried out simply by introducing the pressure medium inlet line in a targeted manner.

It is also conceivable for the pressure medium inlet line to comprise an angled end portion which is arranged in the filter chamber for deflecting the pressure medium flow. Along with the reduction in structural expenditure as a result of combining two elements, the process control expenditure, once again, is further minimized in this way as the introduction of the pressure medium inlet line into the at least one first flexible film is almost arbitrary, and the deflection of the pressure medium flow more likely occurs as a result of the angled end portion.

According to a further development, the filter medium comprises a lattice non-woven fabric or a foam material. The simple design of the filter element and in particular the connection between the individual components makes it possible to use different filter media such as those just mentioned. The mesh width of the filter surface is variable in wide ranges.

According to a further development of the filter element, the connecting seam is realized, in particular, as a weld seam. However, a connecting seam in the form of a bonded seam is also conceivable. In an advantageous manner, however, the weld seam is produced by means of high-frequency welding. In particular as a result of the welding, very stable and long-life connections can be produced between the two films and possibly between the two films and the filter medium.

According to a further development of the filter element, the filter chamber can be filled by means of a gaseous pressure medium, in particular air. A simple and cost-efficient filling of the filter chamber can be achieved in this way.

According to a further development of the filter element, the connecting seam is circular in form. Expressed another way, when looked at from above in the direction perpendicular to the plane of the connecting seam, the connecting seam has a circular form. Filter devices which can be filled simply and reliably can be produced in this way. However, it is also possible, corresponding to the respective space available at the site of installation, to choose a development of the filter element where the connecting seam has a form other than the circular form, such as, for example, an elliptical form.

It is conceivable for the at least one first and second film to comprise a noise-reducing coating. In this case, the coating can be a foam material coating, as a result of which the flow noises that occur in the filter chamber are able to be reduced further. The coating, for example in the form of a foam material coating, in this case, is arranged in particular in the filter chamber.

According to a further development, the at least one first and second film are produced from plastics material. As a result, it is possible to produce a cost-efficient, space-saving filter element, the form of which is adaptable.

According to a further aspect of the invention, a pneumatic adjusting arrangement for a vehicle seat is created with the following features. It has at least one balloon which is fillable with a pressure medium as an adjusting element. In this case, the balloon can comprise or consist equally of at least one first and one second film, which films are connected together along a connecting seam in order to form the balloon. In this case, here too the at least one first and one second film can be respective separate films or, however, also corresponding portions of one single film. In addition, the pneumatic adjusting arrangement has a fluid line for filling and/or emptying the at least one balloon. Furthermore, it has a filter element according to an above-described design, which is arranged in the fluid line in order to remove particles entrained in the pressure medium. In this way, a pneumatic adjusting arrangement is created which, on account of its components, is space-saving, adaptable in its form and ensures reliable operation as the risk of line closures is minimized as a result of providing the filter element. A further advantage of providing the filter element in the fluid line is produced to the effect that pressure medium pulses, which come from a pressure medium source, pass first of all into the filter element and are damped there as a result of the flexible design of the filter chamber before they are directed further in the direction of a fillable balloon. This, in turn, increases the comfort for a user sitting on a vehicle seat as, for said user, the steep or rapid pressure pulse edges have already been damped beforehand in the filter element during a seat contour adjustment.

According to a development of the pneumatic adjusting arrangement, said pneumatic adjusting arrangement additionally has a valve device which is provided in the fluid line for volume flow control. In this case, it is possible for the filter element to be arranged between the valve device and the at least one balloon and/or between a pressure medium source and the valve device. Secure removal of unwanted particles in the pressure medium is ensured in this manner.

According to a further aspect of the invention, a vehicle seat, in particular a passenger vehicle seat, is created with the following features. It has a seat bearing surface in the form of a seat and/or a back rest. In addition, it includes a pneumatic adjusting device according to a design shown above or to a development thereof, the at least one balloon being provided in the region of the seat bearing surface and being arranged in the vehicle seat in such a manner in order to modify the contour of the seat bearing surface. In particular, a modification of this type in the contour of the seat bearing surface can be used within the framework of a massage program for a user or within the framework of a seat that corresponds to the dynamics of the vehicle movement as a comfort function.

According to a further aspect of the invention, a method for producing a filter element for a pneumatic adjusting arrangement (in particular for a vehicle seat) is created. In this case initially at least one first and one second film is provided. A filter medium for removing particles entrained in the pressure medium is then arranged between the at least one first and one second film. The at least one first and one second film are then connected together in such a manner at a connecting seam that between the films a filter chamber is realized which is separated by the filter medium into a first part chamber and a second part chamber, such that pressure medium introduced into the first part chamber is filtered in the direction of the second part chamber when traversing the filter medium. A space-saving filter element which has a form that is able to be adapted and which is producible at minimum structural and process control expenditure is created in this way.

In this case, it is additionally conceivable, prior to or even after the connecting of the at least one first and one second film, for a pressure means inlet line to be provided in the at least one first film and at least one pressure means outlet line to be provided in the at least one second film in order to be able to introduce pressure medium into the first part chamber and to be able to remove pressure medium out of the second part chamber.

According to a further development of the method, the filter medium is arranged between the at least one first and one second flexible film and is connected to the films along the connecting seam. In this way, the process control expenditure for producing the filter element is further minimized as with the step of connecting the at least one first and second film the connecting to the filter medium is also effected additionally at the same time.

It must be mentioned that advantageous developments of the filter element, insofar as applicable to the pneumatic adjusting arrangement, the vehicle seat and the method for producing the filter element, are also to be viewed as advantageous developments of the pneumatic adjusting arrangement, of the vehicle seat and of the method, and vice versa.

Figure 1:
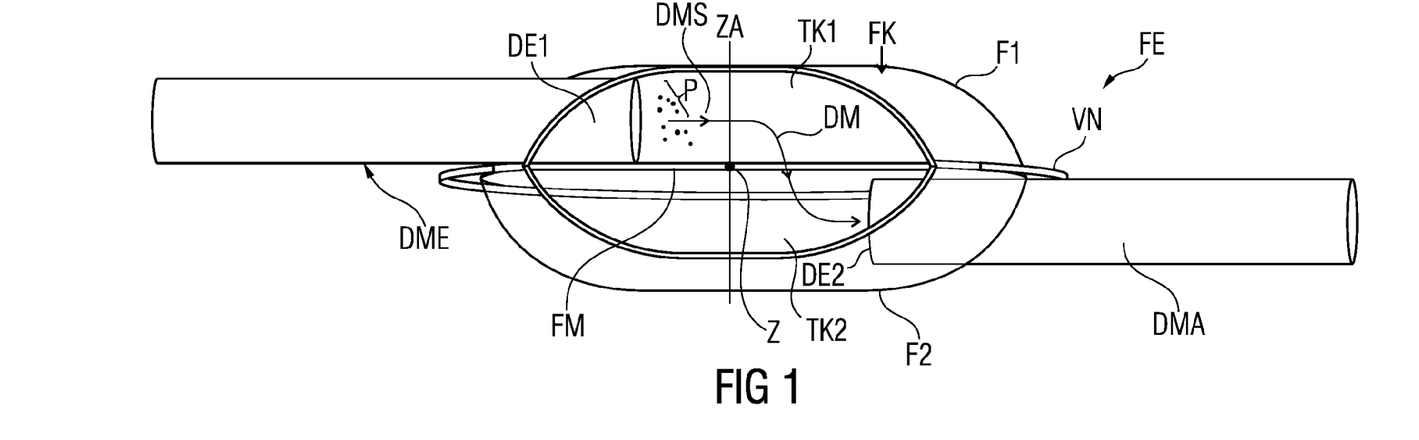
FIG. 1 shows a schematic sectional view of a filter element according to a first embodiment of the invention.

Reference is first of all made to FIG. 1 which shows a schematic sectional view of a filter element FE for a pneumatic adjusting arrangement for a vehicle seat, in particular a passenger vehicle seat, according to a first embodiment of the invention. In this case, the filter element FE includes a filter chamber FK which, in this case, is formed from two films F1 and F2. The films, in this case, can be realized in particular from plastics material. In this case, these are flexible films or films that can alter their form. It is possible, in this case, for said films also to be developed in a resilient manner.

Figure 2:
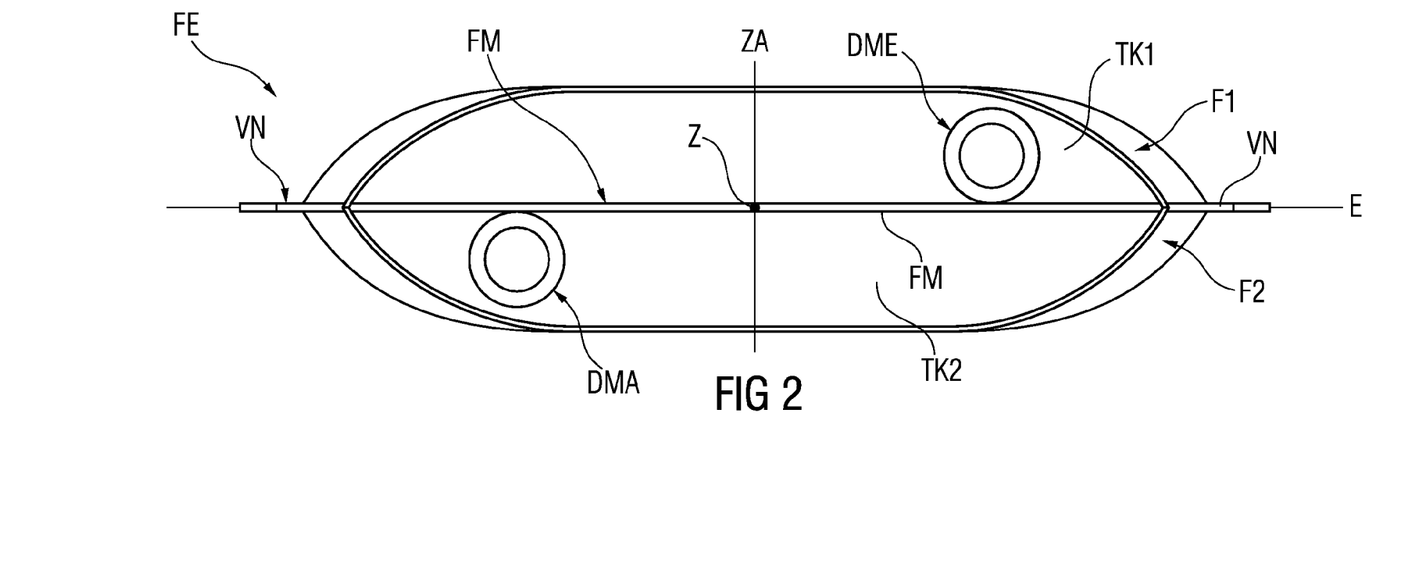
FIG. 2 shows a schematic sectional view of the filter element shown in FIG. 1 in a view which is rotated by 90° about an axis which runs through the center and extends perpendicular to the connecting seam plane.

For further explanation of the design of the filter element, reference is additionally made to FIG. 2 which shows a schematic sectional view of the filter element shown in FIG. 1, in said sectional representation a cut through the filter element FE being shown rotated by 90° with reference to an axis ZA through the filter element. The axis ZA, in this case, extends perpendicular to a connecting plane E, which will be explained in more detail subsequently and extends through a center Z of the filter element.

As is shown in particular on the left and right side of FIG. 2, the two films F1 and F2 are connected together in a positively bonded manner so as to be pressure-medium-tight at a connecting seam VN. In this case, the connecting seam can be realized in particular as a weld seam. A filter chamber FK, which is traversable by a pressure medium DM, in particular air, is created as a result of connecting the two films F1 and F2 (by means of the connecting seam VN). A filter medium FM, for example in the form of a lattice non-woven fabric or a foam material, which separates the filter chamber FK into a first part chamber TK1 and a second part chamber TK2, is provided in the filter chamber FK. As can also be seen in FIG. 2, the filter medium FM is situated between the first film F1 and the second film F2 and is connected to the two films F1 and F2 at the weld seam FN.

The filter element FE additionally comprises a pressure medium inlet line DME which comprises an end portion DE1 which projects through a recess in the first film F1 into the first part chamber TK1. In addition, the filter element FE comprises a pressure medium outlet line DMA which projects through a recess of the second film into the second part chamber TK2. The pressure medium DM can then be moved or introduced via the pressure medium inlet line DME into the first part chamber TK1, the pressure medium outlet line DMA serving to remove the pressure medium DM out of the second chamber, said pressure medium having flowed out of the first part chamber TK1 via the filter medium into said second chamber. More precisely, the pressure medium DM, according to the schematic representation in FIG. 1, is introduced into the first part chamber TK1 at the end portion DE1 of the pressure medium inlet line and flows schematically along the pressure medium flow direction DMS shown (shown by three small arrows) from the first part chamber TK1 through the filter medium FM into the second part chamber TK2 and to the second end portion DE2 of the pressure medium outlet line DMA. The filter medium FM, in this case, serves for removing particles entrained in the pressure medium, such as dust or other particles which contaminate the pressure medium. As will also be mentioned with reference to FIG. 3, the connecting seam VN extends in a connecting seam plane or connecting plane E. According to the embodiment of a filter element FE according to the invention shown in FIG. 2, the filter medium FM also extends in the connecting plane E and consequently divides the filter chamber FK into the two part chambers TK1 and TK2. As a result of designing the films F1 and F2 and also the filter medium FM from a flexible material, the entire filter element is flexible or adaptable in its form and can consequently be installed flexibly and in a simple manner at its site of destination or operating site. In addition, the advantage of the filter element according to the invention, in particular according to the embodiments shown in the figures, is that as a result of designing the filter chamber by flexible films and, for example, not a hard plastics material housing, a space-saving design is made possible. Furthermore, noise reduction is achieved as a result of there being no filter element components that can clatter. Finally, the filter element is able to be incorporated directly into a pressure medium line from a pressure medium source to a balloon as an adjusting element without having to carry out a large amount of expenditure on assembly.

Figure 3:
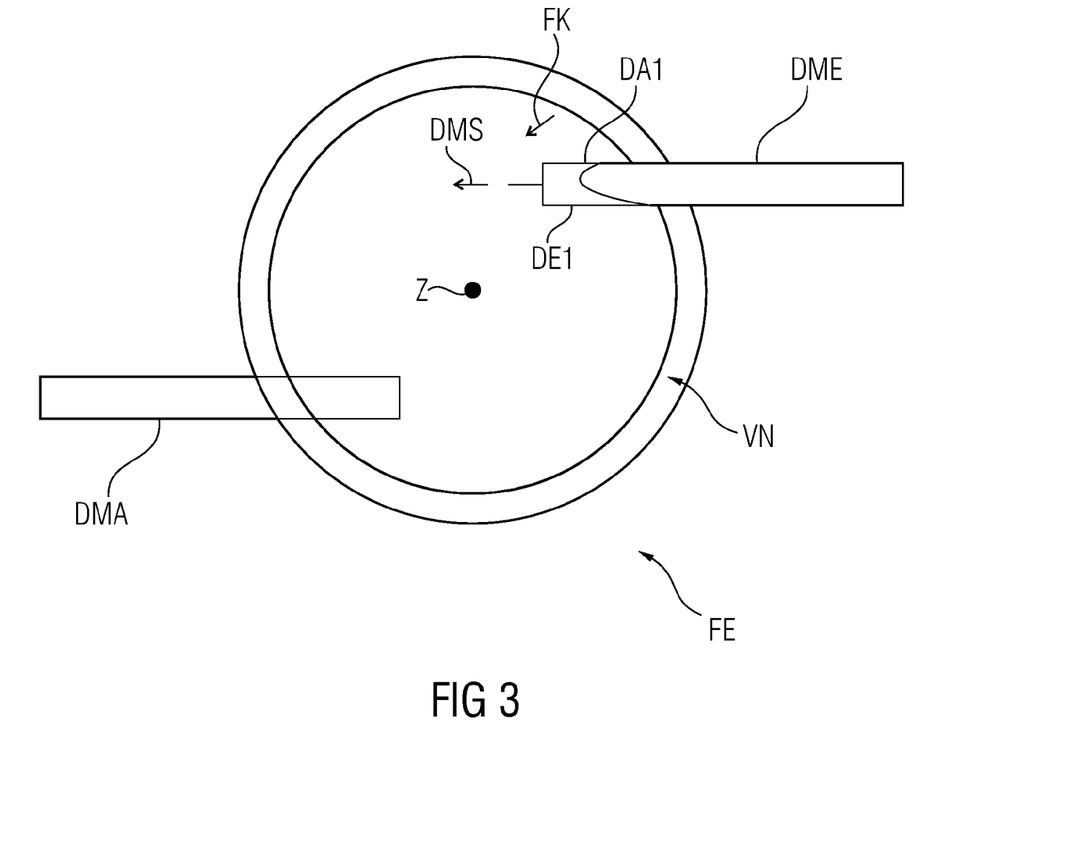
FIG. 3 shows a schematic top view onto the filter element shown in FIG. 1.

Reference is now made to FIG. 3 which shows a schematic top view (along the axis ZA) onto the filter element FE shown in FIGS. 1 and 2. The main component part of the filter element FE is, once again, the filter chamber FK which is formed by the two films F1 and F2 (cf. FIGS. 1 and 2 in this connection) and in which the filter medium is situated. As can be seen in FIG. 3, the connecting seam VN, which connects the two films F1 and F2 as well as the filter medium FM (cf. FIGS. 1 and 2), is circular in form such that in the case of a top view onto the filter element FE a filter chamber FK with a circular circumference is produced. The center Z is situated in the middle of said circle.

As can be seen in FIG. 3, the pressure medium inlet line DME has a straight end portion DE1 which reaches through a recess DA1 of the first film F1 into the filter chamber FK or the first part chamber TK1 thereof. In this case, said end portion DA1 at the same time also provides a pressure medium flow alignment, by means of which pressure medium which flows through the pressure medium inlet line DME into the filter chamber FK or first part chamber TK1 is aligned along the pressure medium flow direction DMS. As can be seen in the figure, the alignment of the pressure medium flow is effected according to the arrow DMS away from the center Z such that no turbulent flows are created which are produced, in particular, by flowing directly against the wall of the filter chamber FK which is located opposite the pressure medium inlet. In particular, an alignment of the pressure medium flow along an inside wall of the filter chamber, above all tangentially in the configuration of FIG. 3, is advantageous. In the case of said embodiment of the filter element FE shown in FIG. 3, it must be emphasized that by providing a straight end portion DE1 of the pressure medium inlet line DME and the targeted incorporation of said end portion into the recess DA1 of the first film F1 such that the pressure medium flow points away from the center, it is possible to produce a filter element FE in a simple manner and with minimum process control and structural expenditure where, along with the advantageous space-saving and adapting characteristics, in addition the flow noise when the pressure medium flows in is also clearly reduced.

Figure 4:
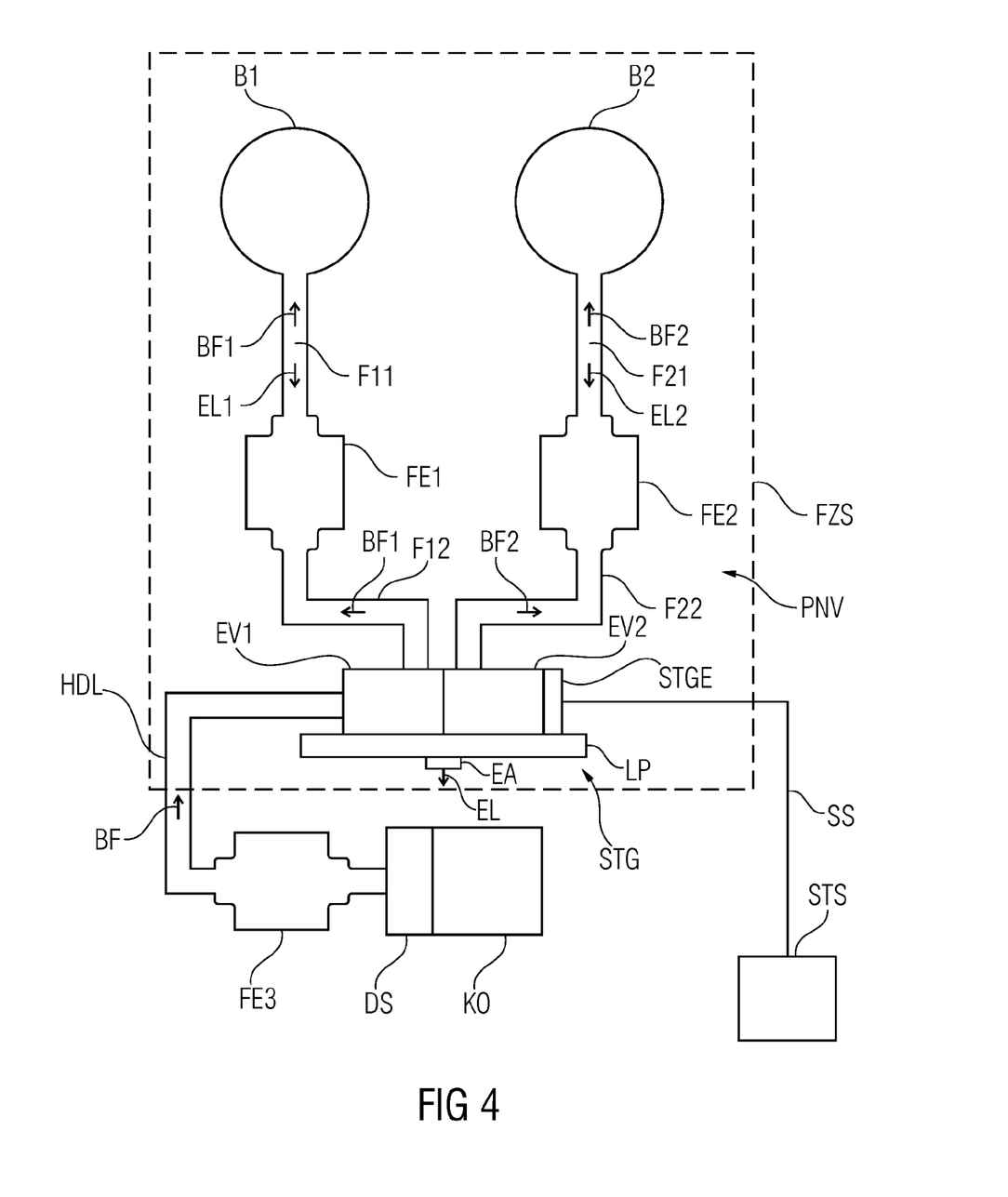
FIG. 4 shows a schematic view of a pneumatic adjusting arrangement for a vehicle seat according to an example embodiment of the invention.

Reference is now made to FIG. 4 which shows a schematic representation of a pneumatic adjusting arrangement PNV which is provided in a vehicle seat FZS. The vehicle seat FZS, in this case, can comprise a seat or a seat cushion and a back rest, with which a user of the seat, such as, for example, the driver of a vehicle, comes into contact or bears against when he is sitting on the seat. In summary, the two surfaces against which a user of the seat bears can be designated as "seat bearing surfaces".

To realize comfort functions in the vehicle seat FZS, in this case, according to the embodiment of FIG. 4, two chambers or balloons B1 and B2 which can be filled with a pressure medium, in particular with compressed air, are provided. Although according to the embodiment shown in FIG. 4 only two balloons are provided, it is also conceivable to provide just one or more than two balloons in the vehicle seat FZS for example to realize comfort functions. In particular, these types of balloons can be arranged as adjusting elements under a seat bearing surface, whether it be on the seat or the seat cushion itself and/or on the back rest. As a result of the possibility of filling the balloons with air, the volume thereof can be altered such that the respective seat bearing surface or the contour thereof is also modifiable as a result of the volume change in a corresponding balloon. A corresponding pressure surface can be generated in particular for a user of the seat who is sitting on the seat by filling a corresponding balloon. In this way, a massage function, for example, can be realized by alternately filling and emptying a corresponding balloon. It is also possible to realize a seat that corresponds to the dynamics of the vehicle movement where, in dependence on a steering angle of a vehicle, one or more balloons are filled with pressure medium to stabilize the user on the vehicle seat.

The pressure medium necessary for filling the balloons B1 and B2, in particular in the form of compressed air, is provided from a pressure source which is realized, in particular, in the form of a compressor KO. According to the embodiment of FIG. 4, said compressor supplies a pressure medium store DS with compressed air and is designed to keep the pressure in the pressure store DS above a predefined pressure value by means of a corresponding pressure control. However, it is also conceivable to realize a pneumatic adjusting arrangement PNV without a corresponding pressure store DS. The compressed air provided from the compressor KO or the pressure store DS is provided by means of a main pressure line HDL to a seat control device STG. Said seat control device STG, in this case, can comprise a printed circuit board LP, on which on one side electro-pneumatic valves EV1 and EV2 are provided and on the other side control device electronics STGE for actuating the valves EV1 and EV2 electrically. The valves EV1 and EV2, in this case, can be magnetically actuatable valves or valves controlled by means of a piezoelectric actuator or piezoelectric chip, wherein as a result of the control device electronics STGE applying a corresponding control signal, a corresponding valve is actuatable for a pressure medium flow corresponding to the arrows BF, BF1, BF2 for filling a corresponding balloon B1 and/or B2.

In a corresponding manner, as a result of a respective ventilation signal from the control device electronics STGE, a respective valve EV1 and EV2 can be moved into a position in which pressure medium or compressed air can be removed from a balloon B1 corresponding to the arrow EL1 or the balloon B2 corresponding to the arrow EL2 through a ventilation outlet EA (combined by one arrow EL) out of a respective compressed air branch.

Characteristic of the pneumatic adjusting arrangement PNV is the provision of a respective filter element FE1 and FE2 between a respective valve (EV1 or EV2) and a corresponding balloon (B1 or B2). It is also conceivable, to provide a filter element FE3 between the pressure medium source and a valve in addition to providing a corresponding filter element between the valve and the balloon. In this case, according to the representation of FIG. 4, a first fluid line or compressed air line F11 is provided between the balloon B1 and the first filter element FE1 and a second fluid line or compressed air line F12 is provided between the first filter element FE1 and the corresponding electro-pneumatic valve EV1. Analogously to this, a third fluid line or compressed air line F21 is provided between the second balloon and the second filter element FE2 and a fourth fluid line or compressed air line F22 is provided between the second filter element FE2 and the second electro-pneumatic valve EV2 which corresponds with the second balloon B2. The compressed air lines mentioned F11, F12, F21 and F22 can be plastics material lines or rubber hose lines which project into the corresponding filter chambers or part chambers of the respective filter elements. It must be noted that the filter elements FE1, FE2 and FE3 can be developed corresponding to an embodiment shown in FIGS. 1 to 3. In this case, the filter elements can comprise a circular circumference or can comprise another arbitrary form, as is shown in FIG. 4.

The filling or emptying of the balloons B1 and B2 is effected, as already mentioned above, by correspondingly connecting the valves EV1 and EV2 which are actuated by the control device electronics STGE. In this case, corresponding actuating programs (for example massage programs) can be filed in the control electronics STGE, said actuating programs being executed when called up in response to an external control signal SS which, for example, is transmitted by a seat control device STS. It is also conceivable for corresponding programs to be filed in the seat control device STS and, when required, to be transmitted to the control device electronics STGE.

As a result of providing the filter elements FE1, FE2 and FE3, it is now possible to filter out particles entrained in the pressure medium which could otherwise block up the filigree pressure medium lines and could disturb a reliable operation. As a result of the flexible-shape and space-saving design, the filter elements can also be incorporated in a simple manner in the vehicle seat FZS without adding to its dimensions. In addition, pressure medium pulses which originate from a pressure medium source (either directly from the same of from a valve), can initially pass into the filter element and be damped there as a result of the flexible design of the filter chamber before they are directed further in the direction of a fillable balloon.

Figure 5:
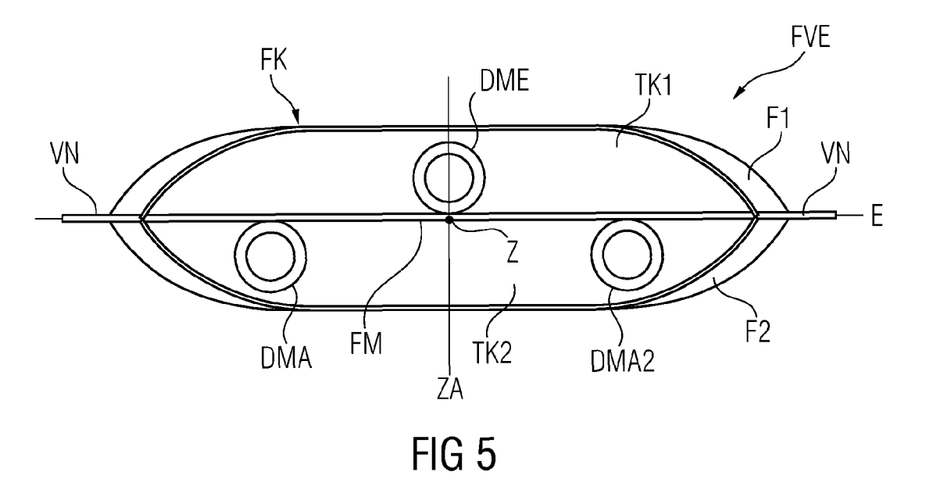
FIG. 5 shows a schematic sectional view of a filter element according to a second example embodiment of the invention.
Figure 6:
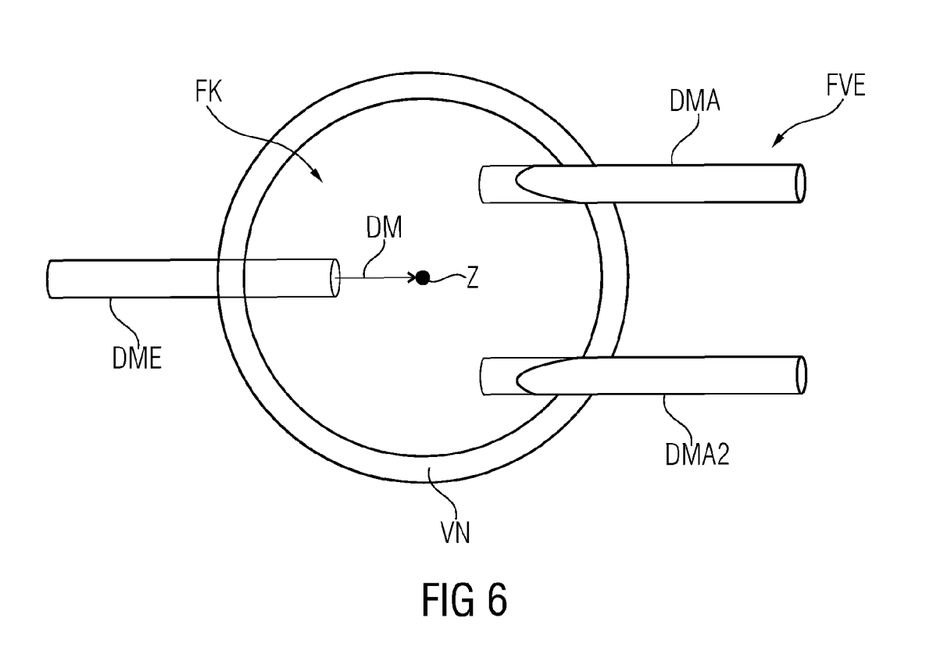
FIG. 6 shows a schematic top view onto the filter element shown in FIG. 5.

After representing the filter element FE of the first embodiment and its use in a pneumatic adjusting arrangement PNV, reference is now made to FIGS. 5 and 6 which show a filter element FVE according to a second embodiment. Said filter element FVE, in this case, corresponds in design substantially to the filter element FE of the first embodiment (which is why the same elements are also provided with the same references), however, the filter element FVE is, more precisely, a filter element expanded to form the filter element FE.

Reference is made initially to FIG. 5 which shows a schematic sectional view of the filter element FVE for a pneumatic adjusting arrangement for a vehicle seat, in particular a passenger vehicle seat. In this case, the filter element FVE includes a filter chamber FK which is again formed from two films F1 and F2. The films, in this case, can be realized in particular of plastics material. In this case, these are flexible films or films that are able to change their shape. It is possible, in this case, for said films also to be realized in a resilient manner. An axis ZA extends, in this case, perpendicular to a connecting plane E and extends through a center Z of the filter element FVE.

As is shown in particular on the left and right side of FIG. 5, the two films F1 and F2 are connected together in a positive bonding and pressure-medium-tight manner at a connecting seam VN. In this case, the connecting seam can be realized in particular as a weld seam. A filter chamber FK, which is traversable by a pressure medium DM, in particular air, is created as a result of connecting the two films F1 and F2 (by means of the connecting seam VN). A filter medium FM, for example in the form of a lattice non-woven fabric or a foam material, which separates the filter chamber FK into a first part chamber TK1 and a second part chamber TK2, is provided in the filter chamber FK. As can also be seen in FIG. 5, the filter medium FM is situated between the first film F1 and the second film F2 and is connected to the two films F1 and F2 at the weld seam FN.

The filter element FVE additionally comprises a pressure medium inlet line DME which projects through a recess in the first film F1 into the first part chamber TK1. In addition, the filter element FVE comprises a first pressure medium outlet line DMA and—as a characteristic of the second embodiment—a second pressure medium outlet line DMA2 which project through a recess of the second film into the second part chamber TK2. The pressure medium DM can then be moved or introduced via the pressure medium inlet line DME into the first part chamber TK1, the pressure medium outlet lines DMA and DMA2 serving for removal of the pressure medium DM from the second chamber, said pressure medium having has flowed out of the first part chamber TK1 via the filter medium into said second chamber. The filter medium FM, in this case, serves for removing particles entrained in the pressure medium, such as dust or other particles which contaminate the pressure medium.

As can be seen in FIG. 5, the filter medium FM (as also the connecting seam VN) extends in the connecting plane E and consequently divides the filter chamber FK into the two part chambers TK1 and TK2. As a result of the design of the films F1 and F2 and also of the filter medium FM from a flexible material, the entire filter element is flexible or adaptable in its form and can consequently be installed flexibly and in a simple manner at its site of destination or operation.

As a result of providing two pressure medium outlet lines DMA and DMA2, the filter element FVE can also serve as a distributor or distributing element such that, for example, several consumers or balloons (cf. FIG. 4) are able to be supplied with pressure medium by means of the two pressure medium outlet lines DMA and DMA2 (only one pressure medium inlet line in the filter element being necessary). It must be noted that it is additionally possible also to provide more than two pressure medium outlet lines in place of two pressure medium outlet lines, depending on the application case.

Reference is now made to FIG. 6 which shows a schematic top view (along the axis ZA) onto the filter element FVE shown in FIG. 5. Once again, the main component part of the filter element FVE is the filter chamber FK which is formed by the two films F1 and F2 and in which the filter medium is situated. As can be seen in FIG. 6, the connecting seam VN, which connects the two films F1 and F2 as well as the filter medium FM (cf. FIG. 5), is circular in form such that in the case of a top view onto the filter element FE, a filter chamber FK with a circular circumference is produced. The center Z is situated in the middle of said circle.

What is claimed is:

1. A filter element for a pneumatic adjusting arrangement of a vehicle seat, the filter element comprising:
   a filter chamber that is fillable with a pressure medium and includes at least a first flexible film and a second flexible film connected together along a connecting seam to define the filter chamber;
   a filter medium arranged in the filter chamber and separating the filter chamber into a first chamber portion and a second chamber portion, the filter medium being configured to remove particles from the pressure medium;
   a pressure medium inlet line for introducing the pressure medium into the first chamber portion;
   wherein the second chamber portion is configured to receive the pressure medium from the first chamber portion via the filter medium; and
   at least one pressure medium outlet line for removing the pressure medium out of the second chamber portion.

2. The filter element of claim 1, wherein the filter medium is connected along the connecting seam.

3. The filter element of claim 1, further comprising a pressure medium aligning device configured to align the pressure medium flow when the pressure medium flows into the first chamber portion, wherein the pressure medium aligning device is configured to align the pressure medium inlet flow away from the center of the first chamber portion.

4. The filter element of claim 3, where the pressure medium aligning device comprises an end portion of the pressure medium inlet line.

5. The filter element of claim 4, where the pressure medium inlet line comprises a straight end portion which is moved into the first chamber portion such that the pressure medium inlet flow is aligned away from the center of the first chamber portion.

6. The filter element of claim 1, where the filter medium comprises a lattice non-woven fabric or a foam material.

7. The filter element of claim 1, where the connecting seam is a weld seam.

8. The filter element of claim 1, where the filter medium is traversable by air.

9. The filter element of claim 1, where the connecting seam is circular.

10. A pneumatic adjusting arrangement for a vehicle seat, said pneumatic adjusting arrangement comprising:
    at least one balloon that is fillable with a pressure medium as an adjusting element;
    at least one fluid line for at least of filling and emptying the at least one balloon; and
    a filter element arranged in the fluid line and configured to remove particles entrained in the pressure medium, the filter element comprising:
    a filter chamber fillable with the pressure medium and including at least a first flexible film and a second flexible film connected together along a connecting seam to define the filter chamber; and
    a filter medium arranged in the filter chamber and separating the filter chamber into a first chamber portion and a second chamber portion, the filter medium being configured to remove particles from the pressure medium;
    wherein the second chamber portion is configured to receive the pressure medium from the first chamber portion via the filter medium.

11. A vehicle seat comprising:
    a seat bearing surface; and
    a pneumatic adjusting arrangement comprising:
    at least one balloon that is fillable with a pressure medium as an adjusting element;
    at least one fluid line for at least of filling and emptying the at least one balloon; and
    a filter element arranged in the fluid line and configured to remove particles entrained in the pressure medium, the filter element comprising:
    a filter chamber fillable with the pressure medium and including at least a first flexible film and a second flexible film connected together along a connecting seam to define the filter chamber; and
    a filter medium arranged in the filter chamber and separating the filter chamber into a first chamber portion and a second chamber portion, the filter medium being configured to remove particles from the pressure medium;
    wherein the second chamber portion is configured to receive the pressure medium from the first chamber portion via the filter medium; and
    wherein the at least one balloon is arranged below the seat bearing surface for influencing the contour thereof.

12. A method for producing a filter element for a pneumatic adjusting arrangement, said method comprising:
    providing at least a first film and a second film;
    arranging a filter medium between the first and second films, the filter medium being configured to remove particles from the pressure medium; and
    connecting the first and second films together at a connecting seam to define a filter chamber that is separated by the filter medium into a first chamber portion and a second chamber portion, such that pressure medium introduced into the first chamber portion is filtered by the filter medium upon flowing from the first chamber portion to the second chamber portion.

13. The pneumatic adjusting arrangement of claim 10, wherein the filter medium is connected to the first and second films along the connecting seam.

* * * * *